ically cover essentially..."
UNITED STATES PATENT OFFICE.

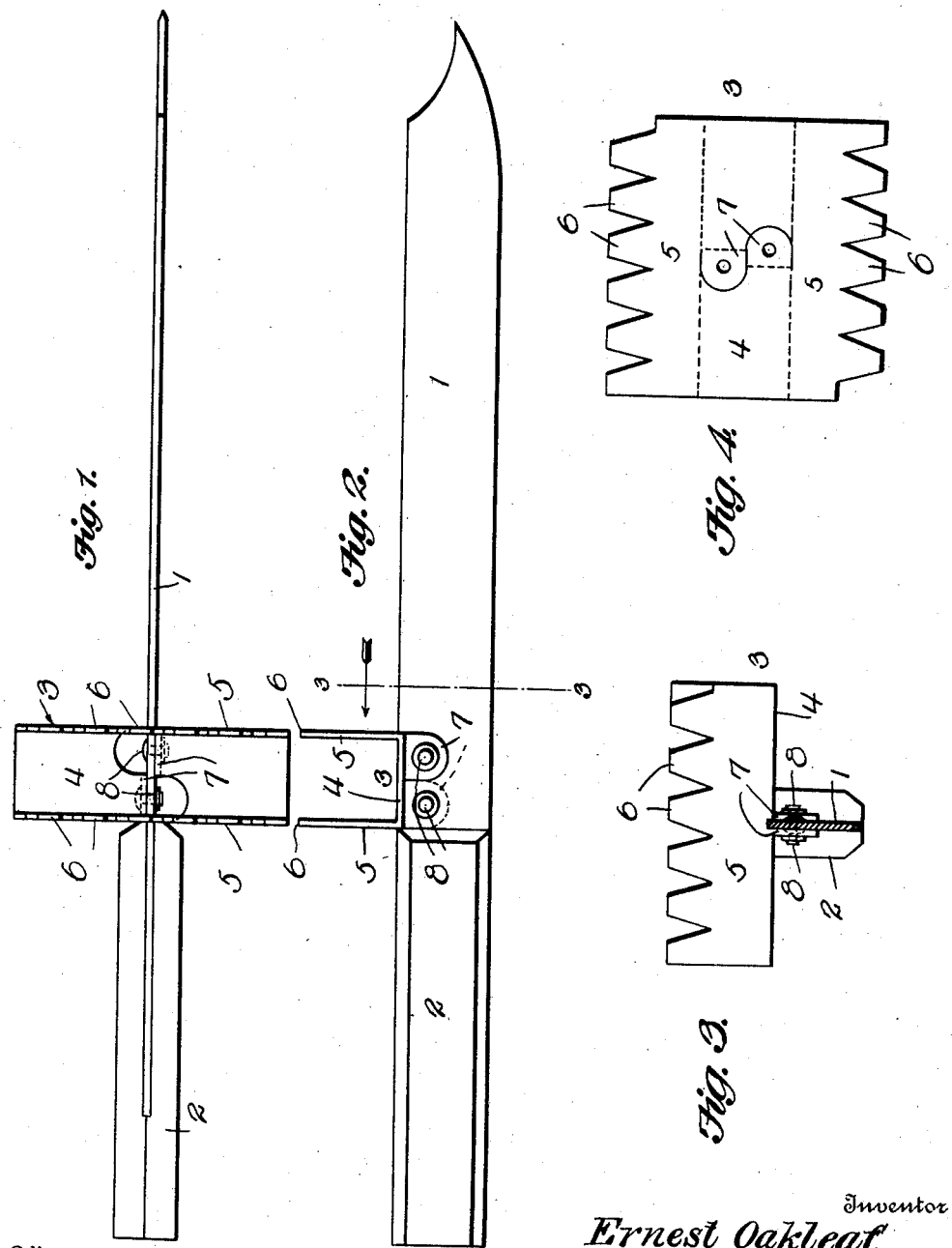

ERNEST OAKLEAF, OF MOLINE, ILLINOIS.

FISH-SCALING DEVICE.

998,382. Specification of Letters Patent. Patented July 18, 1911.

Application filed January 28, 1910. Serial No. 540,615.

*To all whom it may concern:*

Be it known that I, ERNEST OAKLEAF, a citizen of the United States of America, residing at Moline, in the county of Rock Island and State of Illinois, have invented new and useful Improvements in Fish-Scaling Devices, of which the following is a specification.

This invention relates to a fish scaling device formed of sheet metal and provided with tongues bent in opposite directions to engage the opposite sides of the knife blades, whereby the scaling device can be secured in operative position to form the knife blades.

In the drawing, forming a portion of this specification and in which like numerals of reference indicate similar parts in the several views:—Figure 1 is a top plan view of my improved fish scaler and knife. Fig. 2 is a side elevation of the same. Fig. 3 is a detail section taken on the line 3—3 of Fig. 2. Fig. 4 is a detail plan view of the blank from which the scaler is formed.

My improved fish scaler and knife embodies a knife blade 1 which is preferably formed of a flat strip of steel. One end of the said blade is secured between the companion members 2 of a handle. A scaler 3 is mounted transversely of the blade and it is formed preferably from a single sheet of suitable metal which is stamped to form a main body portion 4 and spaced parallel flanges 5, the said flanges having formed thereon suitable scraping teeth 6. The innermost flange is arranged with respect to the handle to form a finger rest so that the knife can be accurately grasped and manipulated during the cutting operation. The main body portion 4 of the blank is stamped to form spaced tongues 7 which are adapted to straddle the portion of the blade 1 at a point adjacent to the forward end of the handle, rivets or other suitable fastening devices 8 being employed for the purpose of securing the said tongues to the blade.

The teeth 6 are each provided with a flat outer scraping surface. These surfaces of the teeth all occupy the same general plane so that a very broad scraping surface is provided. This construction is also such that the device may be readily used in the most efficient manner and successfully operated without tearing the fish.

In use, the implement herein described and shown is held in one hand of the operator and the fish to be operated upon is held in the other hand in a position to permit the operator to conveniently cut the fins and head of the fish, after which the blade of the knife is inverted and the fish may be held in a position to enable the operator to draw the implement across the fish and to move the toothed portions of the flanges 5 of the scaler in contact with the scales. It is obvious that a back and forth movement of the scaler on the fish will effectively remove the scales without causing them to be unnecessarily scattered. The teeth 6 of one flange are arranged directly opposite the spaces between the teeth of the other flange to provide a very broad scraping surface.

I claim:—

As an article of manufacture a fish scaling device formed of a single sheet of metal having its side edges provided with teeth stamped therein and bent to assume a U-shaped form and further formed with centrally located tongues stamped out of said sheet and bent in opposite directions to engage the opposite sides of a knife and adapted to be secured to said knife with the teeth of said device supported transversely on the knife, said teeth being arranged in spaced and in parallel relation.

In testimony whereof I affix my signature in presence of two witnesses.

ERNEST OAKLEAF.

Witnesses:
J. B. OAKLEAF,
FLORENCE A. MCMANNON.

Copies of this patent may be obtained for five cents each, by addressing the "Commissioner of Patents, Washington, D. C."